Patented Feb. 28, 1928.

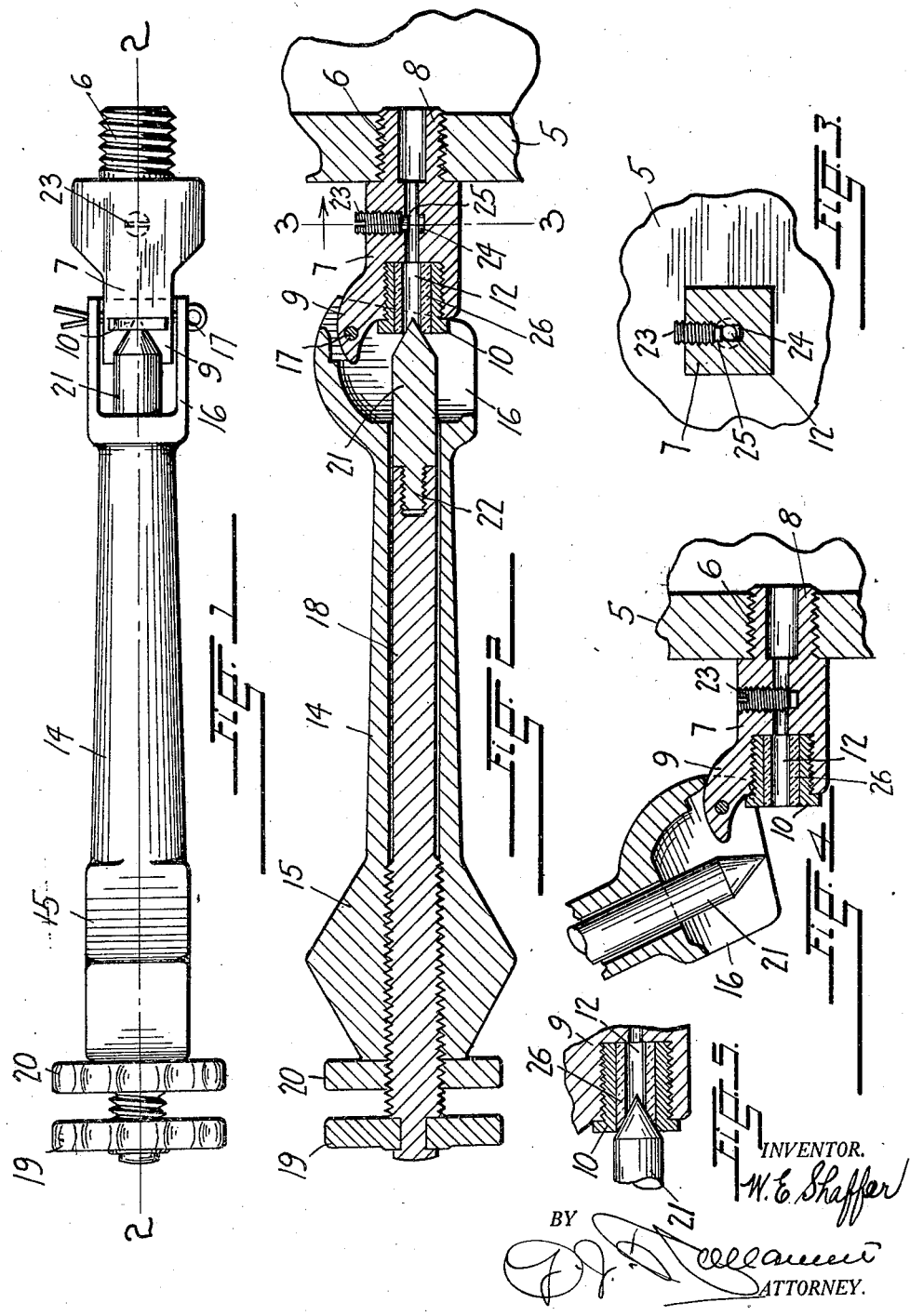

1,660,630

UNITED STATES PATENT OFFICE.

WALLACE E. SHAFFER, OF ORCHARD, COLORADO.

GAUGE COCK.

Application filed January 18, 1927. Serial No. 161,840.

My invention relates to steam boiler gauge cocks, and especially to improvements in those gauge cocks which have either a replaceable valve or valve seat or both.

The main object of the invention is to provide means apart from the valve and valve seat for shutting off the supply of steam that will flow through the gauge cock unless obstructed by some means. Normally the valve and valve seat cooperate to obstruct this flow, but it is occasionally necessary to replace either one or both of these parts, in which case some other means must be provided for checking the flow of the steam.

With the above and other objects in view, my invention consists in the construction and arrangement of parts illustrated in the accompanying drawings, in which like parts are similarly designated throughout the views and in which Figure 1 represents a bottom view of my improved gauge cock, Figure 2, a longitudinal section taken on the line 2—2 of Figure 1, Figure 3, a section taken on the line 3—3 of Figure 2, Figure 4, a fragmentary sectional view of the portions of the members of the device at which they are joined together, showing the means whereby the passage of fluid from the boiler is obstructed when the valve seat or the valve is being removed and replaced, and Figure 5, a fragmentary sectional view, showing the position of the valve and valve seat after a comparatively short period of use.

The reference numeral 5 designates the wall of the boiler, which is provided with a screw-threaded opening 6 for the connection of the nozzle member of the gauge cock. The nozzle member comprises a body 7 having a screw nipple 8 for its connection in the opening of the boiler wall and having a forwardly projecting lug 9 for the pivoted connection of the lever-handle hereinafter to be described.

The body has a longitudinal bore, the outer portion of which is screw-threaded for the application of a headed screw-plug 10. The bore 12 of the screw plug is preferably lined with a bushing of Babbitt metal as at 26. The babbitt provides a cushion that will not rust, pit with steam, or crease by pressure of the steam. However, especially due to its nearness to the boiler, the babbitt by itself would not be hard enough to provide a valve seat, therefore, the plug 10, which is preferably of brass, furnishes a stop for the valve, as shown in Figure 5, and the plug 10 and the babbitt 26 together form the valve seat.

The body also contains a screw-threaded opening larger than, and extending across, said bore. A smooth socket 24 alined with the opening is provided in the body at the opposite side of the bore. A screw plug 23, having a smooth end portion 25, is fitted in said opening, and the smooth end is adapted to snugly fit in the socket.

The passage in the body 7 therefore may be closed when desired, by means of the screw plug.

The plug provides a valve seat for a valve mounted on the lever handle hereinbefore referred to. The handle consists of an elongated body 14 weighted as at 15, and having at one end a recess 16 to admit the forwardly projecting lug 9 of the nozzle member.

The lug and the side walls of the recess have registering openings through which extends a cotter pin 17 for the pivotal connection of the lever member with the nozzle member. The body of the lever member has a longitudinal passage partially screw-threaded for the adjustable connection of a valve which cooperates with the valve seat of the screw plug, to normally obstruct the escape of steam or water from the boiler through the bore of the nozzle member.

The valve consists of a stem 18 screw threaded at one end for its connection with the screw threads of the lever body and provided with a head 19 to facilitate its rotary adjustment. A nut 20 on the threaded portion of the stem engages the end of the lever body to lock the valve in its adjusted positions. The valve proper consists of a pointed stud 21 which is connected in a screw threaded socket at the end of the stem, by means of a correspondingly threaded nipple 22 of reduced diameter. The stud thus connected is continuous with the stem and in axial alinement with the same and its point fills the open end of the plug 10 and of the babbitt 26, as best shown in Figure 5, when the lever member is in its normal position.

In the operation of the gauge cock, the valve is held in contact with its seat by the weight of the lever and when it is desired to test the height of the water in the boiler, the lever is lifted so as to separate the valve from the seat and thereby permit the escape of steam or water through the opening of the nozzle.

The valve is adjusted to its proper closing position by rotation of the threaded stem, and it is secured in its adjusted position by means of the lock nut.

When is is desired to remove either the valve or the valve seat or both, while the cock is connected with a steam boiler, the passage of steam or water through the bore of the nozzle is stopped by screwing home the screw plug 23, which obstructs the outflow of steam or water, and thereby permits of the valve or valve seat or both being removed and others inserted without the escape of any steam or water and without danger of live steam or boiling water burning the person who is doing the repair work.

While the device shown in the drawings and described herein is preferred by reason of its apparent efficiency and simplicity of construction, it will be understood that changes may be made without departing from the spirit of the invention, and it is not desired to limit the present application except as expressly stated in the hereunto appended claims.

Having thus described my invention, what I claim and desire to secure by Letters Patent is:—

1. The combination of a gauge cock comprising a nozzle member adapted for connection with a boiler and having a passage for the escape of fluid from the boiler, a removable plug in the passage, the plug having a lining of metal softer than the plug, and a valve engaging the plug and the lining.

2. The combination of a gauge cock comprising a nozzle member adapted for connection with a boiler and having a passage for the escape of fluid from the boiler, a removable plug in the passage, the plug having a lining of metal softer than the plug, the plug and the lining conjointly forming a valve seat, and a valve engaging the plug and the lining at said seat.

In testimony whereof I have affixed my signature.

WALLACE E. SHAFFER.